US006497418B2

(12) United States Patent
Yahagi

(10) Patent No.: US 6,497,418 B2
(45) Date of Patent: Dec. 24, 2002

(54) TOOL-BIT HOLDING DEVICE IN PERCUSSION TOOL

(75) Inventor: Akihisa Yahagi, Hitachinaka (JP)

(73) Assignee: Hitachi Koki Co., Ltd., Tokyo (JP)

(*) Notice: Subject to any disclaimer, the term of this patent is extended or adjusted under 35 U.S.C. 154(b) by 23 days.

(21) Appl. No.: 09/778,115

(22) Filed: Feb. 7, 2001

(65) Prior Publication Data

US 2001/0013683 A1 Aug. 16, 2001

(30) Foreign Application Priority Data

Feb. 10, 2000 (JP) ....................................... 2000-033221

(51) Int. Cl.[7] .......................... B23B 31/22; B23B 45/16

(52) U.S. Cl. ........................ 279/19.4; 279/75; 279/905; 279/22

(58) Field of Search ........................... 279/19.4, 22, 30, 279/75, 905

(56) References Cited

U.S. PATENT DOCUMENTS 2,751,229 A * 6/1956 Schultz
3,043,614 A * 7/1962 Eichmann
3,398,965 A * 8/1968 Cox
3,735,993 A * 5/1973 Seibert
4,107,949 A * 8/1978 Wanner
4,491,444 A * 1/1985 Rumpp
4,692,073 A * 9/1987 Martindell
4,878,679 A * 11/1989 Plank
5,013,194 A * 5/1991 Wienhold
5,028,057 A * 7/1991 Wanner
5,028,181 A * 7/1991 Jenkins
5,934,846 A * 8/1999 Ishii
5,971,403 A * 10/1999 Yahagi
6,000,940 A * 12/1999 Buss
6,092,814 A * 7/2000 Kageler
6,155,356 A * 12/2000 Kikuchi
6,199,872 B1 * 3/2001 Hasan

* cited by examiner

*Primary Examiner*—Sebastiano Passaniti
(74) *Attorney, Agent, or Firm*—McDermott, Will & Emery

(57) ABSTRACT

A tool-bit holding device in a percussion tool includes a rotatable and axially-movable retainer sleeve for accommodating a shank of a tool bit. A lock member supported by the retainer sleeve is movable radially with respect to the retainer sleeve. The lock member can engage the shank of the tool bit to limit axial movement of the tool bit. A small-diameter surface portion formed by an inner surface of a fixed front cover contacts the rock member and projects at least part of the lock member inward of the retainer sleeve to engage the lock member with the shank of the tool bit when the retainer sleeve is placed at an active position. A conic surface portion formed by the inner surface of the front cover is engageable with the lock member, and is able to variably limit radial movement of the lock member as the retainer sleeve moves axially.

13 Claims, 3 Drawing Sheets

TOOL-BIT HOLDING DEVICE IN PERCUSSION TOOL

BACKGROUND OF THE INVENTION

1. Field of the Invention

This invention relates to a tool-bit holding device in a percussion or impact tool such as an electrically powered hammer.

2. Description of the Related Art

In a known tool-bit holding device in a percussion tool, a ball is provided in a retainer sleeve designed to hold a tool bit. The ball can move between an active position and an inactive position. When assuming the active position, the ball engages the shank of the tool bit so that the tool bit is held in position. When assuming the inactive position, the ball disengages from the shank of the tool bit so that the tool bit can be released. The movement of the ball between the active position and the inactive position is implemented by rotating or axially moving another member provided radially outward of the retainer sleeve. In an alternative design, the ball can be automatically moved between the active position and the inactive position.

Operation of the known tool-bit holding device requires a certain level of load. The known tool-bit holding device can not be easily handled.

There is a known easily-operated tool-bit holding device. The known easily-operated tool-bit holding device is expensive since it is composed of many parts.

In a known mechanism for adjusting the angular position of a tool bit relative to the body of a percussion tool, a steel ball extends into a groove in a retainer sleeve to engage the retainer sleeve. The steel ball can be moved relative to the retainer sleeve along a radial direction. The steel ball is urged by a spring. An adjustment of the angular position of the bit tool can be executed provided that the spring is deformed by an operation grip to allow radial movement of the steel ball.

The known mechanism can not be easily handled since it is necessary to deform the spring by the operation grip during the adjustment of the angular position of the tool bit.

SUMMARY OF THE INVENTION

It is a first object of this invention to provide an inexpensive tool-bit holding device in a percussion or impact tool.

It is a second object of this invention to provide an easily-operated tool-bit holding device in a percussion or impact tool.

A first aspect of this invention provides a tool-bit holding device in a percussion tool (an impact tool). The percussion tool includes a piston (25), a striker (21), an intermediate member (17), and means for causing the striker (21) to follow reciprocation of the piston (25) and to strike the intermediate member (17). The tool-bit holding device comprises a rotatable and axially-movable retainer sleeve (4) for accommodating a shank of a tool bit (1); a lock member (7) supported by the retainer sleeve (4) and being movable radially with respect to the retainer sleeve (4); means for engaging the lock member (7) with the shank of the tool bit (1) to limit axial movement of the tool bit (1); a fixed front cover (14) extending radially outward of the retainer sleeve (4); means (13) for urging the retainer sleeve (4) axially forward; a small-diameter surface portion **(14*b*) formed by an inner surface of the front cover (14), and contacting the rock member (7) and projecting at least part of the lock member (7) inward of the retainer sleeve (4) to engage the lock member (7) with the shank of the tool bit (1) when the retainer sleeve (4) is placed at an active position by the urging means (3); and a conic surface portion (14*a*) formed by the inner surface of the front cover (14) and adjoining the small-diameter surface portion (14*b*), the conic surface portion (14*a*) being engageable with the lock member (7) and variably limiting radial movement of the lock member (7) as the retainer sleeve (4)** moves axially.

A second aspect of this invention is based on the first aspect thereof, and provides a tool-bit holding device further comprising means for inhibiting the lock member (7) from moving axially relative to the retainer sleeve (4).

A third aspect of this invention is based on the first aspect thereof, and provides a tool-bit holding device wherein the lock member (7) comprises a steel ball (7).

A fourth aspect of this invention is based on the first aspect thereof, and provides a tool-bit holding device further comprising a plurality of grooves **(4*a*) formed in the retainer sleeve (4), an engagement member (12) supported on the front cover (14) and being movable radially with respect to the retainer sleeve (4), the engagement member (12) being fittable into one of the grooves (4*a*) the retainer sleeve (4), and a holder (10) rotatably provided on the front cover (14) and limiting radial movement of the engagement member (12) depending on a rotational position of the holder (10)**.

A fifth aspect of this invention is based on the fourth aspect thereof, and provides a tool-bit holding device further comprising a spring (11) for urging the engagement member (12) toward the retainer sleeve (4), the spring (11) having a portion contacting the engagement member (12) and being radially movable, a small-diameter area **(10*a*) formed by an inner surface of the holder (10) and being engageable with the portion of the spring (11) to inhibit radial movement of the portion of the spring (11) and radial movement of the engagement member (12), and a large-diameter area (10*b*) formed by the inner surface of the holder (10) for allowing radial movement of the portion of the spring (11) and radial movement of the engagement member (12)**.

A sixth aspect of this invention is based on the fifth aspect thereof, and provides a tool-bit holding device wherein the spring (11) comprises a leaf spring (11) fitting around a portion of an outer circumferential surface of the front cover (14).

A seventh aspect of this invention is based on the sixth aspect thereof, and provides a tool-bit holding device wherein the engagement member (12) comprises a steel ball (12).

An eighth aspect of this invention is based on the fifth aspect thereof, and provides a tool-bit holding device further comprising a rotatable operation grip (6) engaging the holder (10), wherein the holder (10) rotates as the operation grip (6) rotates.

A ninth aspect of this invention is based on the eighth aspect thereof, and provides a tool-bit holding device further comprising at least two grooves **(14*c*, 14*e*) formed in the front cover (14), a second engagement member (8) supported on the operation grip (6) and being movable radially relative to the operation grip (6), the second engagement member (8) being fittable into one of the grooves (14*c*, 14*e*) in the front cover (14), and a second spring (9) for urging the second engagement member (8) toward the front cover (14)**.

A tenth aspect of this invention provides a tool-bit holding device in a percussion tool (an impact tool). The percussion tool includes a piston (25), a striker (21), an intermediate member (17), and means for causing the striker (21) to follow reciprocation of the piston (25) and to strike the intermediate member (17). The tool-bit holding device comprises a rotatable retainer sleeve (4) for accommodating a shank of a tool bit (1); a lock member (7) supported by the retainer sleeve (4) and being movable radially with respect to the retainer sleeve (4); means for engaging the lock member (7) with the shank of the tool bit (1) to limit axial movement of the tool bit (1); a fixed front cover (14) extending radially outward of the retainer sleeve (4); a plurality of grooves (4*a*) formed in the retainer sleeve (4); an engagement member (12) supported on the front cover (14) and being movable radially with respect to the retainer sleeve (4), the engagement member (12) being fittable into one of the grooves (4*a*) in the retainer sleeve (4); and a holder (10) rotatably provided on the front cover (14) and limiting radial movement of the engagement member (12) depending on a rotational position of the holder (10).

An eleventh aspect of this invention is based on the tenth aspect thereof, and provides a tool-bit holding device further comprising means (11) for urging the engagement member (12) toward the retainer sleeve (4), the spring (11) having a portion contacting the engagement member (12) and being radially movable, a small-diameter area (10*a*) formed by an inner surface of the holder (10) and being engageable with the portion of the spring (11) to inhibit radial movement of the portion of the spring (11) and radial movement of the engagement member (12), and a large-diameter area (10*b*) formed by the inner surface of the holder (10) for allowing radial movement of the portion of the spring (11) and radial movement of the engagement member (12).

A twelfth aspect of this invention is based on the eleventh aspect thereof, and provides a tool-bit holding device wherein the urging means (11) comprises a leaf spring (11) fitting around a portion of an outer circumferential surface of the front cover (14).

A thirteenth aspect of this invention is based on the twelfth aspect thereof, and provides a tool-bit holding device wherein the engagement member (12) comprises a steel ball (12).

DETAILED DESCRIPTION OF THE INVENTION

Figure 1:
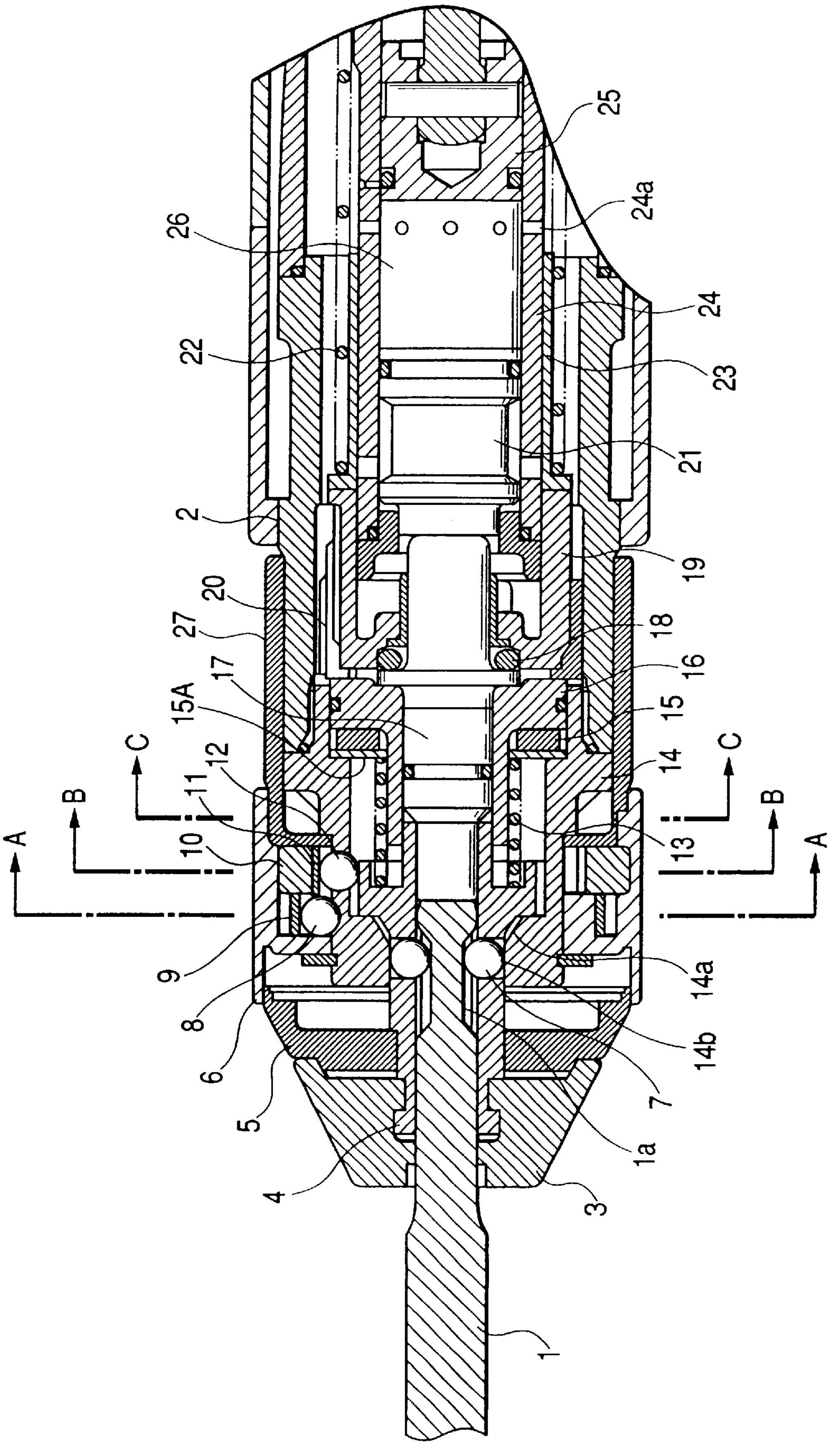
FIG. 1 is a longitudinal section view of a portion of a percussion tool (an impact tool) including a tool-bit holding device according to an embodiment of this invention.
Figure 2:
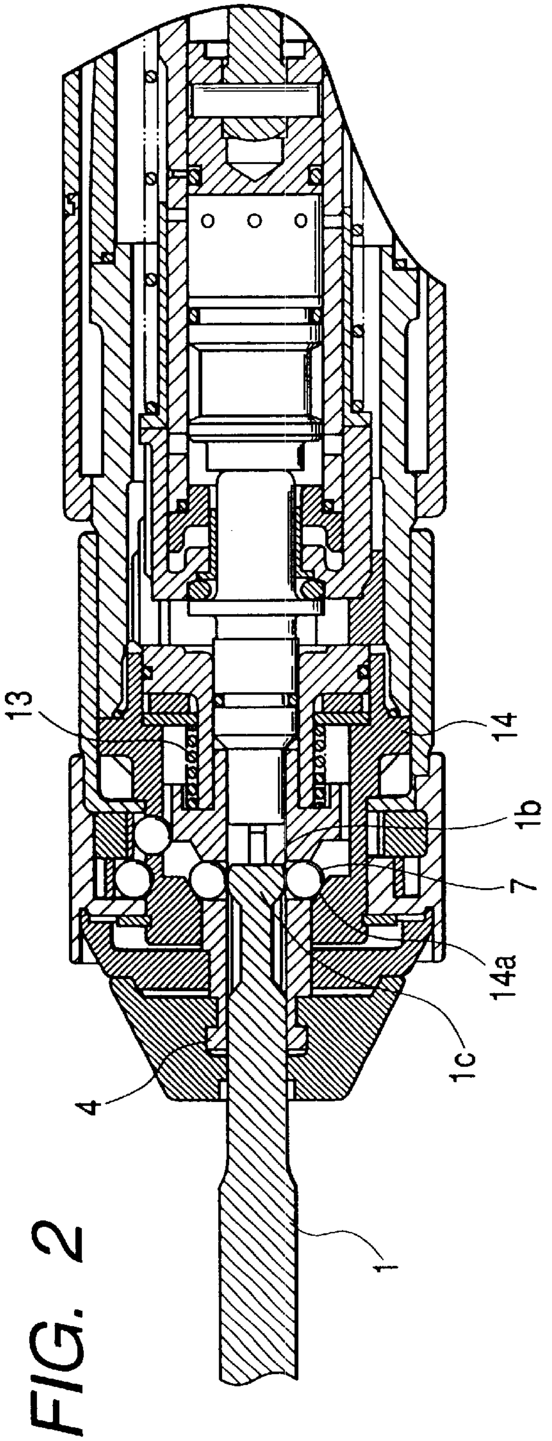
FIG. 2 is a longitudinal section view of the portion of the percussion tool in a state where a tool bit is being attached thereto or detached therefrom.
Figure 3:
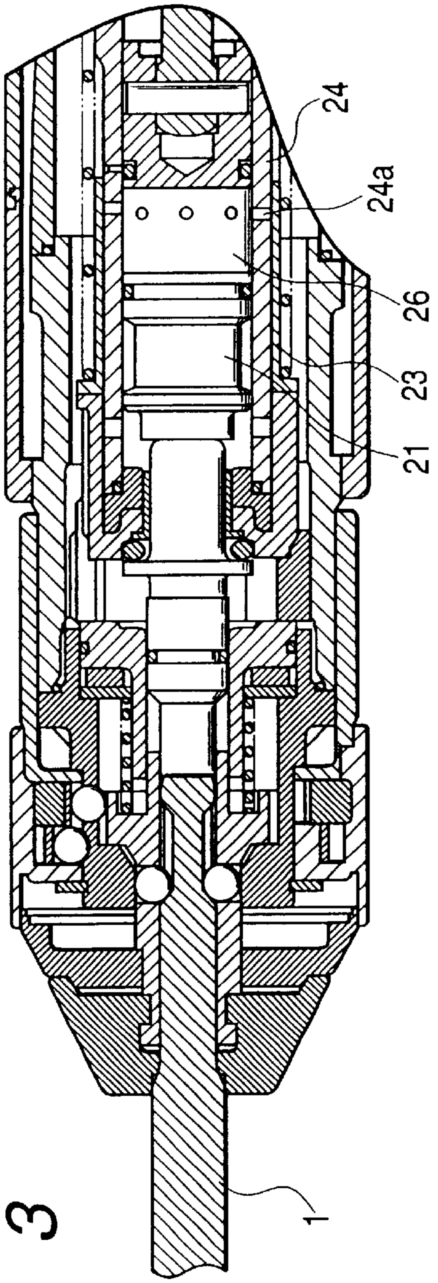
FIG. 3 is a longitudinal section view of the portion of the percussion tool which is operating in a striking mode.
Figure 4:
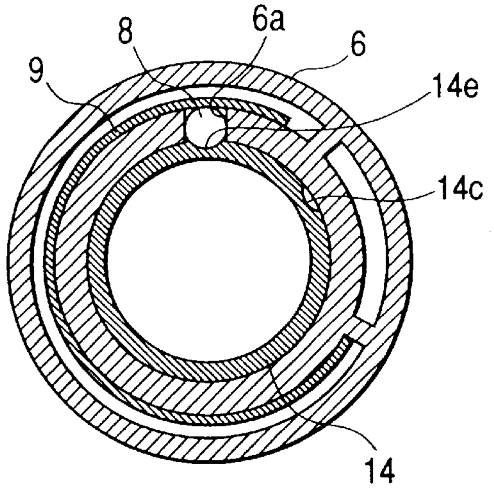
FIG. 4 is a sectional view taken along the line A—A in FIG. 1.
Figure 5:
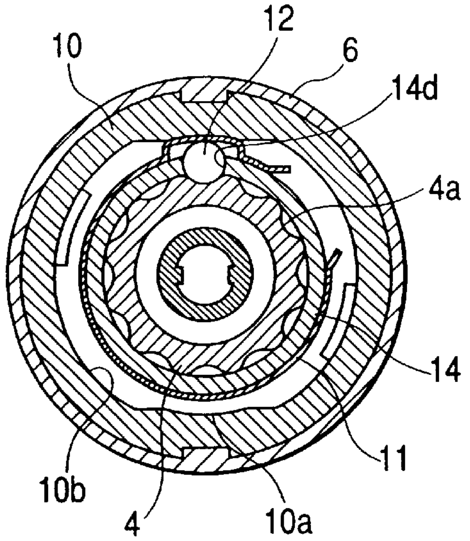
FIG. 5 is a sectional view taken along the line B—B in FIG. 1.
Figure 6:
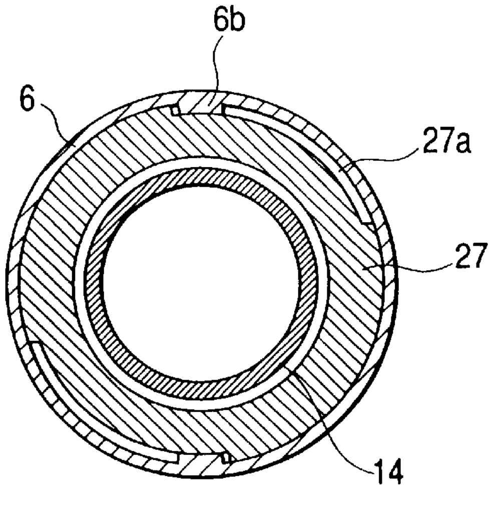
FIG. 6 is a sectional view taken along the line C—C in FIG. 1.

With reference to FIGS. 1–6, a percussion tool (an impact tool) has a body 2. A front cover 14 is fixed to the tool body 2. A retainer sleeve 4 is supported by the front cover 14. The retainer sleeve 4 has an axial bore for accommodating the shank of a tool bit 1. The retainer sleeve 4 can slide axially relative to the front cover 14. In addition, the retainer sleeve 4 can rotate circumferentially relative to the front cover 14.

A spring 13 extends in the rear of the retainer sleeve 4. The spring 13 is seated between the rear end of the retainer sleeve 4 and a ring 15A supported on a hammer holder 16. The ring 15A abuts against a step on the front cover 14. The spring 13 urges the retainer sleeve 4 axially forward.

Steel balls 7 fit into holes through the circumferential wall of the retainer sleeve 4, respectively. In general, the steel balls 7 move together with the retainer sleeve 4 along an axial direction of the retainer sleeve 4. The steel balls 7 act as lock members. Normally, each steel ball 7 projects radially inward from the inner circumferential surface of the retainer sleeve 4, and an inner small-diameter circumferential surface 14b of the front cover 14 engages the steel ball 7 and hence limits movement of the steel ball 7 in a radially outward direction of the retainer sleeve 4. Specifically, the inner small-diameter circumferential surface 14*b* of the front cover 14 contacts the steel balls 7 when the retainer sleeve 4 is in its forwardest position (its active position).

The tool bit 1 is attached to the percussion tool as follows. When the tool bit 1 is inserted into the bore of the retainer sleeve 4, a rear end surface 1*b* of the tool bit 1 meets the steel balls 7. Further insertion of the tool bit 1 slides the retainer sleeve 4 axially backward while deforming and contracting the spring 13. The steel balls 7 move axially backward together with the retainer sleeve 4. As a result, the steel balls 7 move from the inner small-diameter circumferential surface 14*b* to an inner conic surface 14*a* of the front cover 14. Preferably, the inner conic surface 14*a* axially follows and adjoins the inner small-diameter circumferential surface 14*b*. The axis of the inner conic surface 14*a* of the front cover 14 coincides with the axis of the retainer sleeve 4. As the retainer sleeve 4 further moves axially backward, the steel balls 7 move along the inner conic surface 14*a* of the front cover 14. In other words, the steel balls 7 move in a direction intermediate between the radially outward direction and an axially backward direction of the retainer sleeve 4. Thus, the steel balls 7 are displaced in the radially outward direction of the retainer sleeve 4. The radially outward displacement of the steel balls 7 enables a bossed end (a rear end) 1*c* of the tool bit 1 to pass over the steel balls 7. Accordingly, the tool bit 1 moves axially backward relative to the steel balls 7 until contacting a second hammer 17 supported in the tool body 2. The second hammer 17 has an axis coincident with the axis of the retainer sleeve 4. It is understood from the above description that the inner conic surface 14a of the front cover 14 variably limits radial movement of the steel balls (the lock members) 7 as the retainer sleeve 4 moves axially.

The spring 13 urges the retainer sleeve 4 axially forward, pressing the steel balls 7 against the inner conic surface 14*a* of the front cover 14. As a result, the steel balls 7 are subjected to radially inward forces. After the bossed end 1*c* of the tool bit 1 passes over the steel balls 7, axially-extending grooves 1*a* in the shank of the tool bit 1 reach the steel balls 7 respectively. The previously-indicated radially inward forces cause the steel balls 7 to move radially inward and fall into the grooves 1*a* in the tool bit 1, respectively. The grooves 1*a* and the steel balls 7 are designed to form an axial key coupling between the tool bit 1 and the retainer sleeve 4. The grooves 1*a* extend forward of the bossed end 1*c* of the tool bit 1. The spring 13 moves the retainer sleeve 4 axially forward while the steel balls 7 remain extending into the grooves 1*a* in the tool bit 1. The steel balls 7 move axially forward together with the retainer sleeve 4, and come into contact with the inner small-diameter circumferential surface 14*b* of the front cover 14 again. When the steel balls 7 extend into the grooves 1*a* in the tool bit 1 in this way, the retainer sleeve 4 and the tool bit 1 are in engagement via the steel balls 7 so that the tool bit 1 is held by the retainer sleeve 4. In this case, axial movement of the tool bit 1 relative to the retainer sleeve 4 is limited, and the separation of the tool bit 1 from the retainer sleeve 4 is prevented. In addition, the movement of the steel balls 7 in the radially outward direction of the retainer sleeve 4 is limited by the inner small-diameter circumferential surface 14*b* of the front cover 14. Furthermore, the previously-indicated key coupling inhibits relative circumferential rotation between the tool bit 1 and the retainer sleeve 4.

The tool bit 1 is detached from the percussion tool as follows. The retainer sleeve 4 can move axially backward together with a grip 5. The grip 5 engages the retainer sleeve 4. The grip 5 extends radially outward from the retainer sleeve 4. An outer edge of the grip 5 is exposed so that a user can access the grip 5. When the grip 5 is pulled toward the tool body 2, the retainer sleeve 4 moves axially backward (see FIG. 2). The steel balls 7 move axially backward together with the retainer sleeve 4. As a result, the steel balls 7 move from the inner small-diameter circumferential surface 14*b* to the inner conic surface 14*a* of the front cover 14. The inner conic surface 14*a* of the front cover 14 allows the steel balls 7 to be displaced in the radially outward direction of the retainer sleeve 4. When the tool bit 1 is drawn from the retainer sleeve 4, the steel balls 7 move out of the grooves 1*a* in the tool bit 1 and pass over the bossed end 1*c* of the tool bit 1. Therefore, the tool bit 1 is disengaged from the retainer sleeve 4.

The percussion tool having the tool bit 1 in position operates as follows. In the case where the tool bit 1 is pressed against a workpiece (not shown), the second hammer 17 is moved axially backward while remaining in contact with the tool bit 1. As the second hammer 17 is moved axially backward, a sleeve 23 is also moved axially backward. The second hammer 17 is supported by a hammer holder 19. A damper 18 is provided between a flange of the second hammer 17 and a step on the hammer holder 19. The sleeve 23 axially follows and adjoins the hammer holder 19. The sleeve 23 slidably extends around a cylinder 24. The sleeve 23 is connected with the second hammer 17 via the hammer holder 19 and the damper 18. The damper 18 acts to buffer a bouncing force on the second hammer 17. The axially backward movement causes the sleeve 23 to block breathing holes 24*a* through the circumferential wall of the cylinder 24. An air chamber 26 communicating with the breathing holes 24*a* is defined in the cylinder 24. Connection of the air chamber 26 with an exterior is blocked and unblocked when the breathing holes 24*a* are closed and opened respectively. The air chamber 26 extends between a striker 21 and a piston 25 which are slidably disposed in the cylinder 24. The striker 21 and the piston 25 have a common axis. The striker 21 can engage the second hammer 17. The axis of the striker 21 coincides with an axis of the second hammer 17. The piston 25 is axially reciprocated by a drive mechanism including an electric motor (not shown). When the breathing holes 24*a* are blocked by the sleeve 23, a driving force is transmitted from the piston 25 to the striker 21 via the air chamber 26 so that the striker 21 follows motion of the piston 25. Accordingly, the striker 21 axially drives the second hammer 17, thereby axially driving the tool bit 1. In this way, striking action is started and implemented. The second hammer 17 acts as an intermediate member hit by the striker 21.

When the tool bit 1 is separated from the workpiece, the sleeve 23 is returned axially forward by a spring 22. The spring 22 is provided between a flange of the sleeve 23 and a member fixed to the tool body 2 so as to urge the sleeve 23 axially forward. The axially forward return causes the sleeve 23 to unblock the breathing holes 24*a* in the cylinder 24. When the breathing holes 24*a* are unblocked, the transmission of the driving force from the piston 25 to the striker 21 is inhibited. As a result, the striking action is suspended. Upon the separation of the tool bit 1 from the workpiece, a damper 15 buffers the racing impact of the second hammer 17 on the hammer holder 16. The damper 15 is provided between a flange of the hammer holder 16 and the ring 15A abutting against the step on the front cover 14. The ring 15A is supported on the hammer holder 16.

In the case where the tool bit 1 is pressed against the workpiece, the rear end surface 1*b* of the tool bit 1 moves the second hammer 17 axially backward while the steel balls 7 remain extending into the grooves 1*a* in the tool bit 1 and engaging the inner small-diameter circumferential surface 14*b* of the front cover 14. Therefore, in this case, the engagement between the retainer sleeve 4 and the tool bit 1 via the steel balls 7 is maintained so that the tool bit 1 remains held by the retainer sleeve 4.

The outer circumferential surface of the retainer sleeve 4 has grooves 4*a* for receiving a steel ball 12. The grooves 4*a* are angularly spaced at equal intervals. The steel ball 12 is supported on the front cover 14. The steel ball 12 slidably extends through a hole 14*d* in the front cover 14. A leaf spring 11 is provided on the front cover 14. The leaf spring 11 extends on the outer circumferential surface of the front cover 14. The leaf spring 11 urges the steel ball 12 in the radially inward direction of the retainer sleeve 4, thereby pressing the steel ball 12 against the retainer sleeve 4. The leaf spring 11 has a portion for receiving the steel ball 12. This portion of the leaf spring 11 contacts with the steel ball 12 and is radially movable together with the steel ball 12. Normally, the steel ball 12 fits into one of the grooves 4*a* in the retainer sleeve 4.

A ring-shaped ball holder 10 can engage the leaf spring 11. The ball holder 10 extends radially outward of the leaf spring 11. The ball holder 10 is coaxial with the retainer sleeve 4. The ball holder 10 can rotate about its axis. The ball holder 10 engages a rotatable grip 6. The ball holder 10 rotates together with the grip 6. An outer circumferential surface of the grip 6 is exposed so that the user can access the grip 6. An inner circumferential surface of the ball holder 10 has a small-diameter portion 10*a* and a large-diameter portion 10*b*. In the case where the large-diameter portion 10*b* of the inner circumferential surface of the ball holder 10 is located radially outward of the steel ball 12, the steel ball 12 can move radially outward from its normal position against the force of the leaf spring 11 and hence can move out of related one of the grooves 4*a* in the retainer sleeve 4. Provided that the steel ball 12 is permitted to move out of the grooves 4*a*, the retainer sleeve 4 can be rotated relative to the front cover 14. The tool bit 1 can be rotated together with the retainer sleeve 4. Thus, in this case, the angular position of the tool bit 1 relative to the tool body 2 can be adjusted. During the rotation of the tool bit 1 and the retainer sleeve 4 relative to the tool body 2, the steel ball 12 sequentially shifts from one to another of the grooves 4*a*.

When the grip 6 is actuated and hence the ball holder 10 is rotated so that the the small-diameter portion 10*a* of the inner circumferential surface of the ball holder 10 reaches a region radially outward of the steel ball 12, the ball holder 10 and the leaf spring 11 inhibit the steel ball 12 from moving out of related one of the grooves 4*a* in the retainer sleeve 4. Thus, in this case, the retainer sleeve 4 is inhibited from rotating relative to the front cover 14. Accordingly, the tool bit 1 is held and fixed at an angular position relative to the tool body 2 which is determined by the position of the groove 4*a* currently accommodating the steel ball 12.

A grip 27 is fixed to the tool body 2. The grip 6 slidably fits around a front end of the grip 27. The grip 6 has a radially inward projection 6*b*. An outer circumferential surface of the grip 27 has a groove 27*a* extending circumferentially in a predetermined angular range. The projection 6*b* on the grip 6 fits in the groove 27*a* of the grip 27. As the grip 6 rotates relative to the grip 27, the projection 6*b* moves along the groove 27*a*. Walls of the grip 27 which define ends of the groove 27*a* act as stoppers for the projection 6*b* on the grip 6. Therefore, the grip 6 can be rotated only in a limited angular range determined by the circumferential dimension of the groove 27*a*. The grip 6 has an inner circumferential wall formed with a hole 6*a*. A steel ball 8 slidably fits in the hole 6*a*. The outer circumferential surface of the front cover 14 has partially spherical grooves 14*c* and 14*e* spaced at a predetermined angular interval. A leaf spring 9 fitting on the inner circumferential wall of the grip 6 presses the steel ball 8 against the front cover 14. Normally, the steel ball 8 fits into one of the partially spherical grooves 14*c* and 14*e*. The steel ball 8 can be moved out of related one of the partially spherical grooves 14*c* and 14*e* against the force of the leaf spring 9. As the grip 6 is rotated relative to the front cover 14, the steel ball 8 shifts between the partially spherical grooves 14*c* and 14*e*. The steel ball 8, the leaf spring 9, the partially spherical grooves 14*c* and 14*e*, and a land of the front cover 14 between the grooves 14*c* and 14*e* can give the user a suitable feeling of rotation of the grip 6.

The percussion tool of FIGS. 1–6 provides the following advantages. The tool bit 1 can be easily attached and detached to and from the percussion tool. Furthermore, the percussion tool can be easily assembled. Specifically, to attach the tool bit 1 to the percussion tool, the tool bit 1 is inserted into the retainer sleeve 4, and the retainer sleeve 4 is slid backward while the spring 13 is deformed and contacted. The steel balls 7 reach the inner conic surface 14*a* of the front cover 14 which allows radially outward displacement of the steel balls 7. The radially outward displacement of the steel balls 7 enables the bossed end 1*c* of the tool bit 1 to pass over the steel balls 7. Thereafter, the steel balls 7 fall into the grooves 1*a* in the tool bit 1, respectively. The spring 13 returns the retainer sleeve 4 forward while the steel balls 7 remain extending into the grooves 1*a* in the tool bit 1. The steel balls 7 come into contact with the inner small-diameter circumferential surface 14*b* of the front cover 14 again. When the steel balls 7 extend into the grooves 1*a* in the tool bit 1 in this way, the retainer sleeve 4 and the tool bit 1 are in engagement via the steel balls 7 so that the tool bit 1 is held by the retainer sleeve 4.

As understood from the previous description, the ball holder 10, the steel ball 12, the grooves 4*a* in the retainer sleeve 4, and the leaf spring 11 compose a mechanism for adjusting the angular position of the tool bit 1 relative to the tool body 2. Only by moving the large-diameter portion 10*b* of the inner circumferential surface of the ball holder 10 to a region radially outward of the steel ball 12, an adjustment of the angular position of the tool bit 1 is permitted. Accordingly, the tool-bit angle adjustment mechanism can be easily operated.

What is claimed is:

1. In a percussion tool including a piston, a striker, an intermediate member, and means for causing the striker to follow reciprocation of the piston and to strike the intermediate member, a tool-bit holding device comprising:

a rotatable and axially-movable retainer sleeve for accommodating a shank of a tool bit;

a lock member supported by the retainer sleeve and being movable radially with respect to the retainer sleeve;

means for engaging the lock member with the shank of the tool bit to limit axial movement of the tool bit;

a fixed front cover extending radially outward of the retainer sleeve;

means for urging the retainer sleeve axially forward;

a small-diameter surface portion formed by an inner surface of the front cover, and contacting the rock member and projecting at least part of the lock member inward of the retainer sleeve to engage the lock member with the shank of the tool bit when the retainer sleeve is placed at an active position by the urging means; and a conic surface portion formed by the inner surface of the front cover and adjoining the small-diameter surface portion, the conic surface portion being engageable with the lock member and variably limiting radial movement of the lock member as the retainer sleeve moves axially.

2. A tool-bit holding device as recited in claim 1, further comprising means for inhibiting the lock member from moving axially relative to the retainer sleeve.

3. A tool-bit holding device as recited in claim 1, wherein the lock member comprises a steel ball.

4. A tool-bit holding device as recited in claim 1, further comprising a plurality of grooves formed in the retainer sleeve, an engagement member supported on the front cover and being movable radially with respect to the retainer sleeve, the engagement member being fittable into one of the grooves in the retainer sleeve, and a holder rotatably provided on the front cover and limiting radial movement of the engagement member depending on a rotational position of the holder.

5. A tool-bit holding device as recited in claim 4, further comprising a spring for urging the engagement member toward the retainer sleeve, the spring having a portion contacting the engagement member and being radially movable, a small-diameter area formed by an inner surface of the holder and being engageable with the portion of the spring to inhibit radial movement of the portion of the spring and radial movement of the engagement member, and a large-diameter area formed by the inner surface of the holder for allowing radial movement of the portion of the spring and radial movement of the engagement member.

6. A tool-bit holding device as recited in claim 5, wherein the spring comprises a leaf spring fitting around a portion of an outer circumferential surface of the front cover.

7. A tool-bit holding device as recited in claim 6, wherein the engagement member comprises a steel ball.

8. A tool-bit holding device as recited in claim 5, further comprising a rotatable operation grip engaging the holder, wherein the holder rotates as the operation grip rotates.

9. A tool-bit holding device as recited in claim 8, further comprising at least two grooves formed in the front cover, a second engagement member supported on the operation grip and being movable radially relative to the operation grip, the second engagement member being fittable into one of the grooves in the front cover, and a second spring for urging the second engagement member toward the front cover.

10. In a percussion tool including a piston, a striker, an intermediate member, and means for causing the striker to follow reciprocation of the piston and to strike the intermediate member, a tool-bit holding device comprising:

a rotatable retainer sleeve for accommodating a shank of a tool bit;

a lock member supported by the retainer sleeve and being movable radially with respect to the retainer sleeve;

means for engaging the lock member with the shank of the tool bit to limit axial movement of the tool bit;

a fixed front cover extending radially outward of the retainer sleeve;

a plurality of grooves formed in the retainer sleeve;

an engagement member supported on the front cover and being movable radially with respect to the retainer sleeve, the engagement member being fittable into one of the grooves in the retainer sleeve; and a holder rotatably provided on the front cover and limiting radial movement of the engagement member depending on a rotational position of the holder.

11. A tool-bit holding device as recited in claim 10, further comprising means for urging the engagement member) toward the retainer sleeve, the spring having a portion contacting the engagement member and being radially movable, a small-diameter area formed by an inner surface of the holder and being engageable with the portion of the spring to inhibit radial movement of the portion of the spring and radial movement of the engagement member, and a large-diameter area formed by the inner surface of the holder for allowing radial movement of the portion of the spring and radial movement of the engagement member.

12. A tool-bit holding device as recited in claim 11, wherein the urging means comprises a leaf spring fitting around a portion of an outer circumferential surface of the front cover.

13. A tool-bit holding device as recited in claim 12, wherein the engagement member comprises a steel ball.

* * * * *